Figure 1:

Oct. 27, 1964     W. R. GRANER ETAL     3,154,460

ANTI-FOULING COATING

Filed Feb. 29, 1960

INVENTOR
WILLIAM R. GRANER
MAXWELL STANDER

BY

ATTORNEYS

United States Patent Office 3,154,460
Patented Oct. 27, 1964

3,154,460
ANTI-FOULING COATING
William R. Graner, 3934 1st St. SW., Washington, D.C., and Maxwell Stander, 808 Thurman Ave., Hyattsville, Md.
Filed Feb. 29, 1960, Ser. No. 11,940
12 Claims. (Cl. 161—93)
(Granted under Title 35, U.S. Code (1952), sec. 266)

The invention described herein may be manufactured and used by or for the Government of the United States of America for governmental purposes without the payment of any royalties thereon or therefor.

This invention relates to a novel principle and composition of matter for a resinous coating or overlay which may be applied to boat hulls or other structures which are subjected to sea water immersion, for the purpose of preventing or minimizing fouling by a marine mechanism; and more particularly to a resin base anti-fouling coating adapted for application to various types of surfaces or to be used as an integral gel coat or overlay on reinforced plastics to be applied to such plastics when they are being molded.

The majority of prior art anti-fouling coatings consist of dispersions of solid particles of an anti-fouling compound, such as a copper, arsenic or mercural base chemical, or combinations thereof, in a liquid medium such as either a solvent, varnish or dry oil paint.

The aforementioned prior art coatings tend to be brittle, so that they frequently either crack or exfoliate, exposing the under surface, and in addition have poor adhesion and strength characteristics, showing poor abrasion and impact resistance. Such coatings, in themselves provide little or no anti-corrosion protection to water submerged metal surfaces.

In accordance with the instant invention an anti-fouling compound of proven effectiveness such as either a copper, arsenic, or mercural base chemical, or combinations thereof is ground into a fine particle size and dispersed in a resin that is formulated to have controlled permeability in sea water. The resultant product may be used either directly on a surface or first applied to either an organic or inorganic fibrous carrying medium such as glass cloth, for example.

Various types of resins are adapted to be used in the instant invention and the following are cited by way of example:

(a) Resilient or low degree of cross-linkage type polyester.
(b) Rigid-flexible polyester combination.
(c) Undercured or partially cross-linked polyester.
(d) Undercured or partially cross-linked epoxy resin.
(e) Epoxy resin—modified or cross-linked with a constituent which will increase the sensitivity or permeability of the resin to water.

Fibrous glass carrying media such as a woven glass cloth, glass mat, glass mat-roving fabric, woven roving cloth or chopped glass fibers may be used as a resin carrying medium.

Alternatively, fabrics of other materials such as asbestos, Orlon, Dacron, or cotton, etc., may be used. The instant combination of resin and anti-fouling material may be applied directly to a metal hull or the like, or as set forth above it may be applied to a woven glass cloth or the like which in turn is bonded to metal or other materials. In addition the instant invention may be practiced by making the outermost ply of several plies going to make up a glass reinforced plastic hull of a resin-anti-fouling coated layer applied integrally to the hull during formation thereof as for example, as a "gel" coat during fabrication of said hull. The advantages of the instant invention are that it is possible to obtain a larger build-up of coating and greater film strength with longer effectiveness. A thicker buildup will carry larger quantities of anti-fouling compound for the given surface to be protected. In addition the instant invention provides a protected surface in that the reinforced polyester and epoxies are resistant to impact and abrasion to a much greater extent than existing coatings. Furthermore it has been found that glass reinforced polyester or epoxy resins are resistant to penetration by marine borers. Since they are thermo-setting at room temperatures, the instant method makes it possible for the anti-fouling coating to be easily applied inasmuch as the treated resin may be applied cold without heating. Integral coating of reinforced plastic hulls or structures eliminates the need for surface preparation and assures a good bond. Where fouling is expected to be light or especially high impact resistance is not required, the reinforcing material may be eliminated to give a thinner coating.

It is an object of this invention to provide anti-fouling coatings that may be easily and quickly made, the constituents of which are readily available and relatively inexpensive, the spreading of which on surfaces may be accomplished rapidly, economically and efficiently; and to provide simple and inexpensive methods of manufacture of said coatings.

Another object of this invention is to provide an anti-fouling coating that is suitable for use as an integral "gel coat" or overlay on reinforced plastic structures, such as boats or the like.

Still another object of this invention is to provide a marine, anti-fouling coating which during its entire wearing life is anti-fouling, that is, continuously minimizes the permanent attachment of marine growth such as barnacles etc.

A further object of this invention is to provide a marine anti-fouling coating which continually exposes a toxic surface, at least as rapidly as surface toxicity is leached out.

An added object of this invention is to provide a marine anti-fouling coating that has corrosion protection properties for metals.

Still an added object of this invention is to provide such an antifouling coating having as one constituent a partially cross-linked polymer, the degree of cross-linking of which may be controlled at one or more steps in the making of the coating.

Still an added object of this invention is to provide a solvent-free anti-fouling coating as above described which may be applied either hot or cold.

Still a further object of this invention is to provide a molded plastic boat, the "gel-coat" or overlay of which includes a marine anti-fouling material integrally formed therewith.

Another object of this invention is to provide a method of applying a marine anti-fouling coating to the hull of a molded plastic boat or the like during the molding of the boat.

Figure 2:
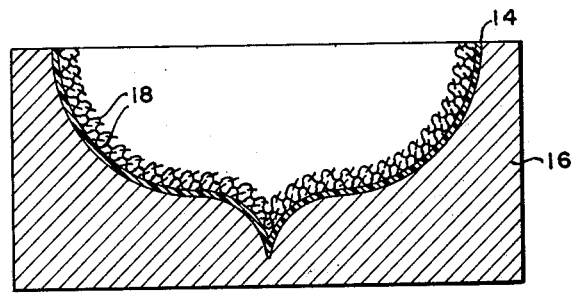

Other objects and many of the attendant advantages of this invention will be readily appreciated as the same becomes better understood by reference to the following detailed description when considered in connection with the accompanying drawing, wherein:

FIG. 1 is a sectional view of a fabric material, such as glass cloth, having the instant inventive anti-fouling coating applied to one surface thereof; and FIG. 2 is a sectional view showing the manner in which the instant anti-fouling coating is adapted to be used as a "gel coat," or overlay, in the manufacture of reinforced plastics, and more specifically a reinforced molded plastic boat.

The instant invention relates to a marine anti-fouling coating 10 adapted to be applied to the surface of a layer of glass cloth or the like 12, being spread thereon either while cold, or heat bonded thereto under heat and pressure in a conventional molding process.

An alternative use for the instant invention is to apply a layer 14 of the air tight anti-fouling material 10 to the interior surface of the female member of a mold 16, represented in FIG. 2 as the cross-section of a boat. In subsequent steps, layers of reinforcing fibers 18 are placed on the interior of the mold in contact with the layer 14 of anti-fouling material, and the entire assembly is bonded together with or without heat and/or pressure in the manner well known in the art, whereby a boat hull is obtained that has integrally bonded to the exterior thereof the anti-fouling surface layer 14.

The instant anti-fouling compound is a combination of either a polyester or epoxy resin and an anti-fouling or toxic composition, the latter being selectively chosen from either of those materials having for example, a copper, arsenic or mercural base or combination thereof.

In accordance with the preferred embodiment of the instant invention, cuprous oxide is used as the toxic composition.

As is generally known in the art, a polyester resin is a solution of unsaturated polyesters resulting from the reaction of difunctional glycols (e.g. diethylene glycol, butanediol-1,4 pentaerythritol) with one or more unsaturated dibasic acids or saturated dibasic anhydrides (e.g. maleic acid, adipic acid, phthalic anhydride, chlorendic acid, etc.) to form the polyester resin. The resultant polyester is cross-linked with a vinyl monomer (e.g. styrene, divinyl benzene, etc.,) with the aid of a free radical catalyst (e.g. methyl ethyl ketone peroxide). Curing results from the copolymerization of the vinyl monomer with the unsaturated groups in the polyester to yield a cross-linked or three dimensionl structure.

It has been found that polyester resins may be formulated which have varying degrees of water permeability and/or solubility, hereinafter referred to as water sensitivity, by adjusting the constituents to change the degree of unsaturation and the number and length of the cross-links. For example, a polyester resin having 30% by weight of styrene cross-linking agent and 24% by weight of unsaturated dibasic acid constituent is much less sensitive to water than a polyester resin having 35% styrene and 6% unsaturated acid. It is postulated that the latter resin is more water sensitive after use, since it is much less cross-linked, due to reduced degree of unsaturation, and, also, that the excess in styrene above the stoichiometric amount required contributes to lengthening of the cross links due to formation of styrene chains. The distance between unsaturated bonds may be varied by interspersing saturated components having longer or shorter molecular length.

The degree of water sensitivity which is "built in" the antifouling resin formulation must be balanced so that the coating has the required life and durability and at the same time maintains the effective action of the antifouling compound itself. If water sensitivity is too great, the antifoul coating will be too soft, readily attacked by chemicals and fuels, and soon become weak and deteriorate; if there is too little water sensitivity the action of the antifoul compound will be reduced to the point where it will be ineffective.

It has been found that the best anti-fouling characteristics can be obtained using a polyester resin having constituents in the following weight percent ranges.

| Component: | Percent by weight |
|---|---|
| Styrene | 30–34 |
| Unsaturated dibasic acid (maleic or fumaric) | 20–9 |
| Saturated dibasic acid— | |
| Phthalic acid | 21.5–7 |
| Adipic acid | 5.5–27.5 |
| Monobasic fatty acids | 4.0–4.5 |
| Polyhydric alcohol— | |
| 1,2-propylene glycol | 15–4 |
| Diethylene glycol | 4–14 |

It is emphasized that the invention is not limited to the above formulations, since there is an unlimited variety of chemical compositions which may be reduced, based on the aforementioned principles.

The aforementioned resin formulations are mixed with a known antifoul compound, such as cuprous oxide, in proportions ranging from 100 to 250 parts of antifoul compound per 100 parts by weight of resin formulation depending on the consistency desired; trowel-on coats tolerate higher proportions of antifoul compound than do brush-on coats. The room-temperature curing catalyst-accelerator system (e.g. organic peroxide plus cobalt or amine type accelerator) is added just prior to application in proportions necessary to obtain the desired room temperature cure time.

As an alternative toxic carrying medium, the instant invention extends to the use of the epoxy resins which are condensation products of epichlorohydrin and bis-phenol, which are cured or cross-linked by the action with compounds from that group containing an active hydrogen. Curing agents or hardeners are compounds with either amino, carboxyl or hydroxyl groups and inorganic acids. Cross-linking and hence water solubility is controlled and limited by undercure of the polymer, resulting from use of less than the stoichiometric proportions of the hardener accompanied by a cure at room temperature.

It is pointed out that previous attempts to formulate the anti-fouling coating using either the polyester or epoxy resins were unsuccessful because of the extremely high resistance of these highly cross-linked, rigid polymers to sea water. In the manner herein set forth, this invention renders the resins slightly water sensitive by limiting the degree of cross-linking and rigidity.

The following are examples of anti-fouling compounds produced in accordance with the instant invention, of which Example 3 is the preferred embodiment:

Example 1

| | Parts by wt. |
|---|---|
| Polyester resin [1] | 150 |
| Cobalt naphthenate (6% Co) | 0.3 |
| MEK peroxide | 3.0 |
| Cuprous oxide | 300 |

[1] Composed of:

| | Percent by weight |
|---|---|
| Styrene | 30 |
| Unsaturated dibasic acid (maleic or fumaric) | 20 |
| Saturated disbasic acids— | |
| Phthalic acid | 21.5 |
| Adipic acid | 5.5 |
| Monobasic fatty acids | 4.0 |
| Polyhydric alcohol— | |
| Diethylene glycol | 4.0 |
| 1,2-propylene glycol | 15.0 |

Resulting composition is readily trowellable with pot life of 54 minutes at 77° F.

Example 2

This is the same formulation as Example 1 except that cuprous oxide is 200 parts by weight. This composition is readily brushable.

Example 3

| | Parts by wt. |
|---|---|
| Polyester resin [1] | 150 |
| Cobalt naphthenate | 0.3 |
| MEK peroxide | 3.0 |
| Cuprous oxide | 300 |

[1] Composed of:

| | Percent by weight |
|---|---|
| Styrene | 32 |
| Unsaturated dibasic acid (maleic or fumaric) | 14.5 |
| Saturated dibasic acids— | |
| Phthalic acid | 14.3 |
| Adipic acid | 16.5 |
| Monobasic fatty acids | 4.2 |
| Polyhydric alcohol— | |
| 1,2-propylene glycol | 9.5 |
| Diethylene glycol | 9.0 |

Resulting composition is readily trowellable with pot life of 43 minutes at 77° F.

Example 4

This is the same formulation as Example 3 except that the cuprous oxide is 200 parts by weight. This is a brushable mixture.

Example 5

| | Parts by wt. |
|---|---|
| Polyester resin [1] | 150 |
| Cobalt naphthenate | 0.3 |
| MEK peroxide | 3.0 |
| Cuprous oxide | 300 |

[1] Composed of:

| | Percent by weight |
|---|---|
| Styrene | 34 |
| Unsaturated dibasic acids (maleic or fumaric) | 9 |
| Saturated dibasic acids— | |
| Phthalic acid | 7 |
| Adipic acid | 27.5 |
| Monobasic fatty acids | 4.5 |
| Polyhydric alcohol— | |
| 1,2-propylene glycol | 4 |
| Diethylene glycol | 14 |

The resulting mixture trowels easily and has a pot life of 25 minutes at 77° F.

Example 6

This is the same formulation as Example 5 except that cuprous oxide is 200 parts by weight to render the mixture brushable.

Example 7

The same as Examples 1–6 except that cobalt naphthenate and MEK peroxide is reduced to 0.15 and 1.5 parts by weight respectively. This results in partial undercure of the polyester resins.

Example 8

| | Parts by wt. |
|---|---|
| Epoxy resin [1] | 150 |
| Diethylene triamine | 24 |
| Cuprous oxide | 348 |

[1] Epoxy equivalent: 190–210 grams of resin containing 1 gram-equivalent of epoxide.

This mixture is trowellable with a pot life of 28 minutes at 77° F.

Example 9

| | Parts by wt. |
|---|---|
| Epoxy resin [1] | 150 |
| Diethylene triamine | 12 |
| Cuprous oxide | 348 |

[1] Epoxy equivalent: 190–210 grams of resin containing 1 gram-equivalent of epoxide.

Mixture is trowellable.

It is emphasized that the invention is not limited to the above listed formulations, which have been cited merely as examples.

The invention applies broadly to the combination of flexibilized either polyester or epoxy resins as a binder with which has been combined a quantity of anti-fouling compound such as cuprous oxide. A selected polyester resin is, in accordance with this invention, flexibilized, by either undercuring, decreasing the number of cross-links or lengthening the cross-links by formation of styrene chains, to the extent necessary to render it water sensitive and yet sufficiently wear resistant.

Obviously many modifications and variations of the present invention are possible in the light of the above teachings. It is therefore to be understood that within the scope of the appended claims the invention may be practiced otherwise than as specifically described.

What is claimed is:

1. An anti-fouling composition comprising an anti-fouling toxic and a binder, said binder being a room-temperature-cured water-permeable, styrene cross-linked polyester resin that is the reaction product of the following components in the ranges indicated—

| Component: | Percent by weight |
|---|---|
| Styrene | 30–34 |
| Phthalic acid | 21.5–7 |
| Maleic acid | 20–9 |
| 1,2-propylene glycol | 15–4 |
| Adipic acid | 5.5–27.5 |
| Diethylene glycol | 4–14 |
| Monobasic fatty acids | 4–4.5 |

2. An anti-fouling composition comprising at least 200 parts by weight of an anti-fouling toxic and 150 parts by weight of a binder; said binder being of a room-temperature-cured, water-permeable styrene cross-linked polyester resin that is the reaction product of

| Component: | Percent by weight |
|---|---|
| Styrene | 30 |
| Phthalic acid | 21.5 |
| Unsaturated dibasic acid chosen from the group consisting of maleic acid and fumaric acid | 20 |
| 1,2-propylene glycol | 15 |
| Adipic acid | 5.5 |
| Diethylene glycol | 4 |
| Monobasic fatty acid | 4 | said binder further including 0.3 part by weight of cobalt naphthenate (6% Co) as an accelerator and 3.0 parts by weight of methyl ethyl ketone peroxide as a catalyst.

3. A water-permeable anti-fouling composition comprising the combination of an anti-fouling toxic agent and a leachable binder, including, in parts by weight, 150 parts of a styrene cross-linked polyester resin, 0.3 part cobalt naphthenate (6% Co) as an accelerator and 3 parts methyl ethyl ketone peroxide as a catalyst; said polyester resin being the reaction product of the following components in the ranges indicated,

| Components: | Percent by weight |
|---|---|
| Styrene | 30 |
| Saturated dibasic acid chosen from the group consisting of phthalic acid and adipic acid | 27 |
| Unsaturated dibasic acid chosen from the group consisting of maleic acid and fumaric acid | 20 |
| Polyhydric alcohols chosen from the group consisting of diethylene glycol and 1,2-propylene glycol | 19 |
| Monobasic fatty acids | 4 |

4. A water-permeable anti-fouling composition comprising the combination of an anti-fouling toxic agent and a leachable binder, including in parts by weight, 150 parts of a styrene cross-linked polyester resin, 0.3 part cobalt naphthenate (6% Co) as an accelerator and 3 parts methyl ethyl ketone peroxide as a catalyst; said polyester resin being the reaction product of the following components in the ranges indicated—

| Components: | Percent by weight |
|---|---|
| Styrene | 32 |
| Adipic acid | 16.5 |
| Unsaturated dibasic acids chosen from the group consisting of maleic acid and fumaric acid | 14.5 |
| Phthalic acid | 14.3 |
| 1,2-propylene glycol | 9.5 |
| Diethylene glycol | 9 |
| Monobasic fatty acids | 4.2 |

5. An anti-fouling composition comprising the combination of an anti-fouling toxic and a binder including, in parts by weight, 150 parts of a styrene cross-linked polyester resin, 0.15 part cobalt naphthenate (6% Co) as an accelerator, and 3 parts methyl ethyl ketone peroxide as a catalyst; said polyester resin being the reaction product of

| Components: | Percent by weight |
|---|---|
| Styrene | 30 |
| Phthalic acid | 21.5 |
| Unsaturated dibasic acid chosen from the group consisting of maleic acid and furmaric acid | 20 |
| 1,2-propylene glycol | 15 |
| Adipic acid | 5.5 |
| Monobasic fatty acids | 4 |
| Diethylene glycol | 4 |

6. A water-permeable anti-fouling composition as described in claim 9, but further characterized by having said anti-fouling toxic agent comprising 200 to 300 parts cuprous oxide and said binder comprising 150 parts of said styrene, cross-linked polyester resin.

7. A water-permeable anti-fouling composition comprising the combination of anti-fouling toxic and a leachable binder, said binder comprising the following formulation:

epoxy resin, 150 parts by weight,
diethylene triamine, 12–24 parts by weight, and
cuprous oxide;

said diethylene triamine being insufficient stoichiometrically to fully cross-link the available epoxide cross-linkages.

8. An anti-fouling composition comprising the combination of an anti-fouling toxic agent and a binder comprising a water-permeable styrene cross-linked polyester resin that is the reaction product of the following components in the ranges indicated—

| Component: | Percent by weight |
|---|---|
| Styrene | 30–34 |
| Unsaturated dibasic acid | 20–9 |
| Saturated dibasic acid | 27–34.5 |
| Monobasic fatty acid | 4–4.5 |
| Polyhydric alcohol | 19–18 |

9. An anti-fouling composition comprising an anti-fouling toxic agent and a binder, said binder being a room-temperature cured water-permeable styrene cross-linked polyester resin that is the reaction product of the following components in the ranges indicated—

| Component: | Percent by weight |
|---|---|
| Styrene | 30–34 |
| Saturated dibasic acids chosen from the group consisting of phthalic acid and adipic acid | 27–34.5 |
| Unsaturated dibasic acid chosen from the group consisting of maleic acid and fumaric acid | 20–9 |
| Polyhydric alcohols chosen from the group consisting of 1,2-propylene glycol and diethylene glycol | 19–18 |
| Monobasic fatty acids | 4–4.5 | including the free methyl ethyl ketone peroxide as a catalyst and cobalt naphthenate as an accelerator.

10. An anti-fouling composition comprising an anti-fouling toxic and a binder as described in claim 1, further characterized by having a structure for immersion in water containing marine organisms, said composition forming an outer layer bonded to the surface of said structure.

11. An anti-fouling composition comprising an anti-fouling toxic and a binder as described in claim 10, further characterized by said structure comprising a glass fabric molded boat hull.

12. An anti-fouling composition comprising an anti-fouling toxic and a binder as described in claim 10, further characterized by said structure comprising a hull of a ship.

References Cited in the file of this patent

UNITED STATES PATENTS

| | | |
|---|---|---|
| 2,195,362 | Ellis | Mar. 26, 1940 |
| 2,280,242 | Kropa et al. | Apr. 21, 1942 |
| 2,500,600 | Bradley | Mar. 14, 1950 |
| 2,579,610 | Pitre et al. | Dec. 25, 1951 |
| 2,592,655 | Carlston et al. | Apr. 15, 1952 |
| 2,738,283 | Furness | Mar. 13, 1956 |
| 2,813,050 | Hickson | Nov. 12, 1957 |
| 2,861,910 | Johnston et al. | Nov. 25, 1958 |
| 2,935,488 | Phillips et al. | May 3, 1960 |
| 2,955,642 | Stark | Oct. 11, 1960 |
| 2,970,923 | Sparmann | Feb. 7, 1961 |
| 2,976,256 | Whittier et al. | Mar. 21, 1961 |
| 3,014,893 | Sussman et al. | Dec. 26, 1961 |

FOREIGN PATENTS

| | | |
|---|---|---|
| 756,239 | Great Britain | Sept. 5, 1956 |
| 796,297 | Great Britain | June 11, 1958 |

OTHER REFERENCES

"Polyesters and Their Applications," Bjorksten Research Laboratories, Inc., 1956, Reinhold Publishing Corporation, New York, pp. 67 and 163–172 relied on.

"Boat Builder Blankets Market With 10 Models," Plastics Industry, February 1950, pp. 26, 27 and 32.